United States Patent
Ho (10) Patent No.: US 7,800,333 B2
(45) Date of Patent: Sep. 21, 2010

(54) AUDIBLE NOISE REDUCTION FOR SINGLE CURRENT SHUNT PLATFORM

(75) Inventor: Eddy Ying Yin Ho, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 367 days.

(21) Appl. No.: 12/051,484

(22) Filed: Mar. 19, 2008

(65) Prior Publication Data

US 2009/0039817 A1 Feb. 12, 2009

Related U.S. Application Data (60) Provisional application No. 60/895,801, filed on Mar. 20, 2007.

(51) Int. Cl.
*G05B 21/02* (2006.01)
(52) U.S. Cl. .................. 318/636; 318/448; 318/599; 318/611
(58) Field of Classification Search ............ 318/400.02, 318/400.24, 448, 460, 569, 594, 599, 600, 318/611, 619, 621, 623, 629, 636, 702, 722, 318/801
See application file for complete search history.

(56) References Cited

U.S. PATENT DOCUMENTS 5,581,452 A * 12/1996 Yamamoto .................. 363/41

| | | | |
|---|---|---|---|
| 6,954,096 B2 * | 10/2005 | Ito et al. | 327/172 |
| 7,382,105 B2 * | 6/2008 | Endo et al. | 318/432 |
| 2003/0048086 A1 | 3/2003 | Takahashi et al. | |
| 2004/0056627 A1 | 3/2004 | Grasso et al. | |
| 2005/0110442 A1 | 5/2005 | Trifilo | |
| 2005/0190094 A1 * | 9/2005 | Andersen | 341/157 |
| 2005/0206341 A1 | 9/2005 | Yin Ho | |
| 2006/0152181 A1 | 7/2006 | Shao et al. | |
| 2006/0192508 A1 | 8/2006 | Albers | |
| 2006/0245743 A1 | 11/2006 | Takahashi | |
| 2007/0090785 A1 | 4/2007 | Ho | |

\* cited by examiner

*Primary Examiner*—Bentsu Ro
(74) *Attorney, Agent, or Firm*—Farjami & Farjami LLP (57) ABSTRACT

A method for reducing audible motor noise in a motor drive, wherein the motor drive includes a motor controller driving a PWM space vector modulator providing gating pulses to an inverter providing phase currents to the phase windings of the motor, and wherein phase currents of the motor are determined by taking samples of the DC link current in a DC link powering the inverter. The method comprises determining the speed of the motor and comparing the speed to a preset threshold, the preset threshold defining a speed at which audible noise is generated by the motor due to a minimum pulse constraint being imposed on the motor phase currents in order to reliably sample the DC link current to measure the phase current. If the speed is below the threshold, the DC link current in the DC link is sampled using a reduced number of current samples for a PWM cycle of the PWM space vector modulator to reduce audible motor noise.

14 Claims, 7 Drawing Sheets

FIG. 1b  Minimum Pulse Constraint

FIG. 1a  Space Vector Plane

FIG. 1d  Minimum Pulse Constraint occurs for both active vectors

FIG. 1c  Modulation vector inside shade region

FIG. 1e Current sampling removal

| U V W | CURRENT | Determined |
|---|---|---|
| 1 1 0 | → Øw | -iw |
| 1 0 0 | → Øu | iu |
| 1 0 1 | → Øv | -iv |
| 0 0 1 | → Øw | iw |
| 0 1 1 | → Øu | -iu |
| 0 1 0 | → Øv | iy |

FIG. 4B

AUDIBLE NOISE REDUCTION FOR SINGLE CURRENT SHUNT PLATFORM

CROSS-REFERENCE TO RELATED APPLICATIONS

This application claims the benefit and priority of U.S. Provisional patent application Ser. No. 60/895,801 filed Mar. 20, 2007 entitled AUDIBLE NOISE REDUCTION FOR SINGLE CURRENT SHUNT PLATFORM, the entire disclosure of which is incorporated herein by reference.

BACKGROUND OF THE INVENTION

The invention relates to a method and apparatus that reduces the motor audible noise induced by using the single current shunt feedback topology of PWM inverter drives. This invention is an extension of U.S. Ser. No. 11/552,758, filed Oct. 25, 2006 (U.S. Patent Publication No. 2007/0090785A1) entitled AUDIBLE NOISE REDUCTION FOR SINGLE CURRENT SHUNT PLATFORM, the contents of which are incorporated herein by reference.

Figure 1A:
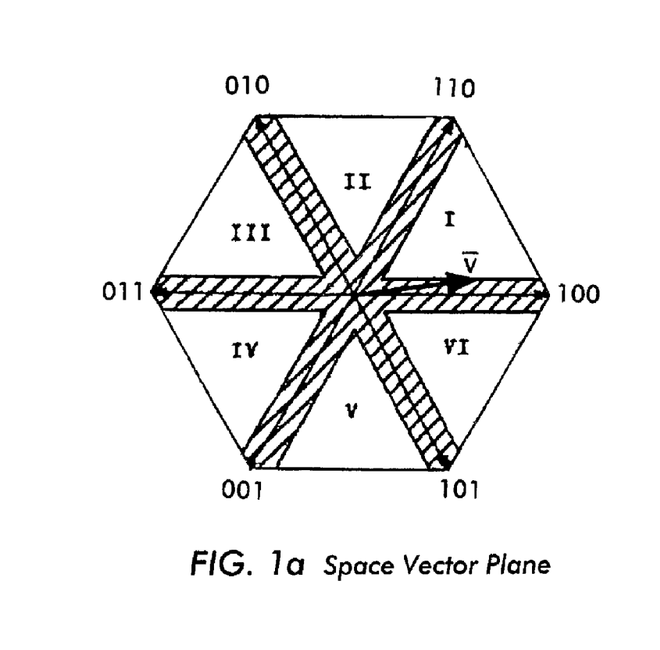
FIG. 1a shows a motor drive space vector plane for phases UVW of a motor showing a modulation vector and the shaded regions where minimum pulse constraint is required.
Figure 1B:
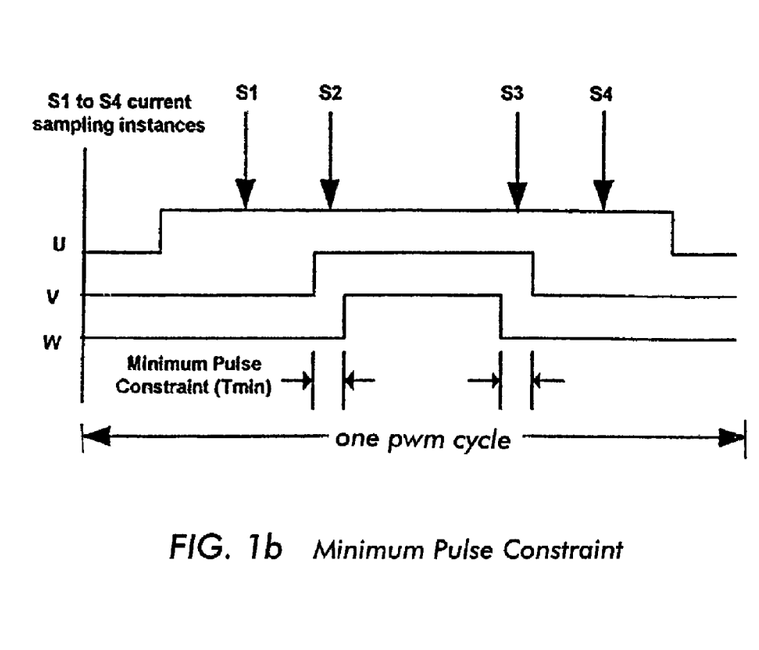

FIG. 1a shows the Space Vector Plane of a 2-level inverter for a motor drive. The vectors correspond to the condition of the high side switches in the inverter of the motor drive, i.e., 100 means the high side switch for the U phase is on and the low side switches of the V and W phases are on. See FIGS. 4 and 4A. In order to observe dc link current and allow reliable current sampling, minimum pulse constraint (FIG. 1b) has to be imposed whenever the voltage vector enters the shaded regions (Sector Crossings of FIG. 1a). This means that the minimum pulse spacing cannot be less than Tmin, otherwise the sampled currents from the DC link shunt sensor are not reliable.

Figure 4:
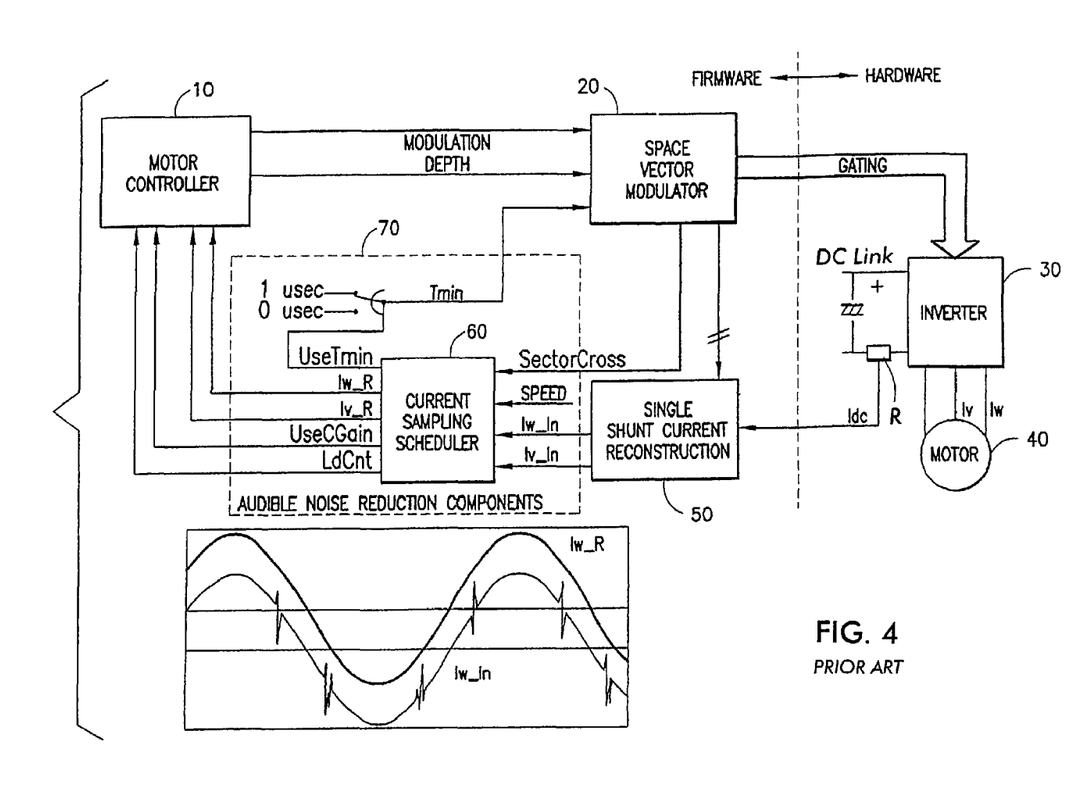
FIG. 4 shows a motor drive block diagram of the prior art.
Figure 4A:
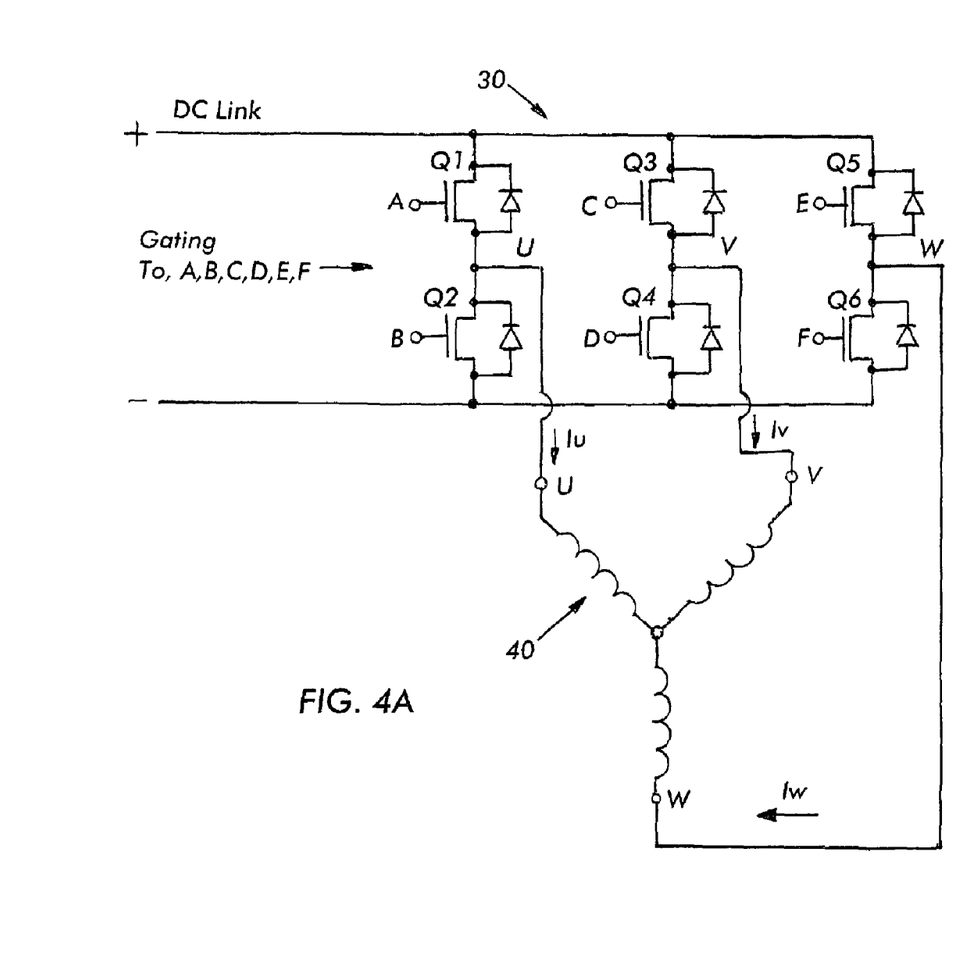
FIG. 4A shows details of the inverter of FIG. 4.
Figure 4B:
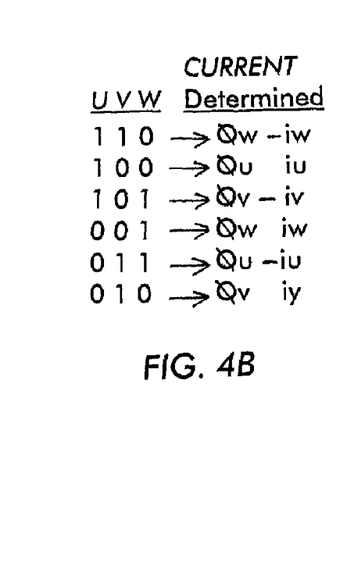
FIG. 4B shows how the phase currents are determined from the U, V, W phase voltages by appropriate timed sampling of the DC link shunt element.

In application Ser. No. 11/552,758, a motor drive is described and shown and a method for audible noise reduction is disclosed. The motor drive is also shown in FIG. 4 herein. This method of motor audible noise reduction involves the reduction of the total number of minimum pulse clampings adaptively inside the shaded regions of FIG. 1a. This is done by introducing a new scheduling for minimum pulse insertion. When the voltage vector enters the sector-crossing area (shaded area), the current feedback sampling rate and motor controller bandwidth are modified in accordance with the new scheduling. As soon as the voltage vector exits the shaded regions, nominal feedback sampling rate and motor controller bandwidth are resumed. In addition, the new scheduling for minimum pulse insertion is adaptive to motor speed. This is done to maximize the achievable controller bandwidth. In this adaptive feedback sampling regime, the PWM switching frequency is unaltered and hence the characteristic of PWM induced harmonics is preserved.

In FIG. 4, the DC link supplies power to the inverter 30. Current samples are taken via the single shunt element, typically a resistor R.

In a 2-level inverter system like that of FIG. 4, the instantaneous current waveform in the DC link is composed of current pulses. The current pulse width reduces as the modulation index (motor speed) decreases up to a point where minimum pulse constraint (hardware dependent, typically 0.5 to 2 usec) has to be imposed in order to acquire reliable current feedback data via the DC link shunt element. As a consequence of this minimum pulse constraint, the current harmonic increases. The motor audible noise spectrum also increases and is spread out which leads to unacceptable noise performance in some applications.

SUMMARY OF THE INVENTION

An object of the invention is to solve the problem stated above. Specifically, the invention relates to a method and apparatus providing a further improvement to reduce audible noise generated by the single current shunt feedback technology described above.

The present invention reduces audible noise by removal of current samples within a PWM cycle when motor speed drops below a certain threshold (modulation index reduces below a certain threshold). Inverter induced audible noise is most prominent at low motor speeds (low modulation index).

Other features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which:

FIG. 1b shows the minimum pulse constraint of the prior art required for the samples S2 and S3 (active vector 110) in a single PWM cycle for the modulation vector of FIG. 1a;

DETAILED DESCRIPTION OF THE INVENTION

Figure 1C:
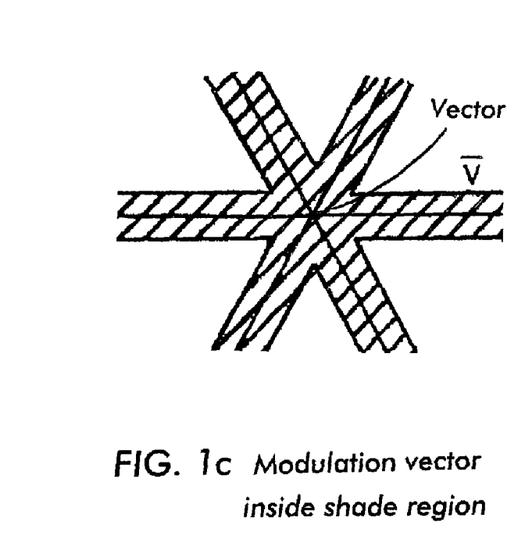
FIG. 1c shows another example of the modulation vector inside the shaded region where the motor current cannot reliably be reconstructed from the DC bus current without requiring the minimum pulse constraint for both sets of samples.
Figure 1D:
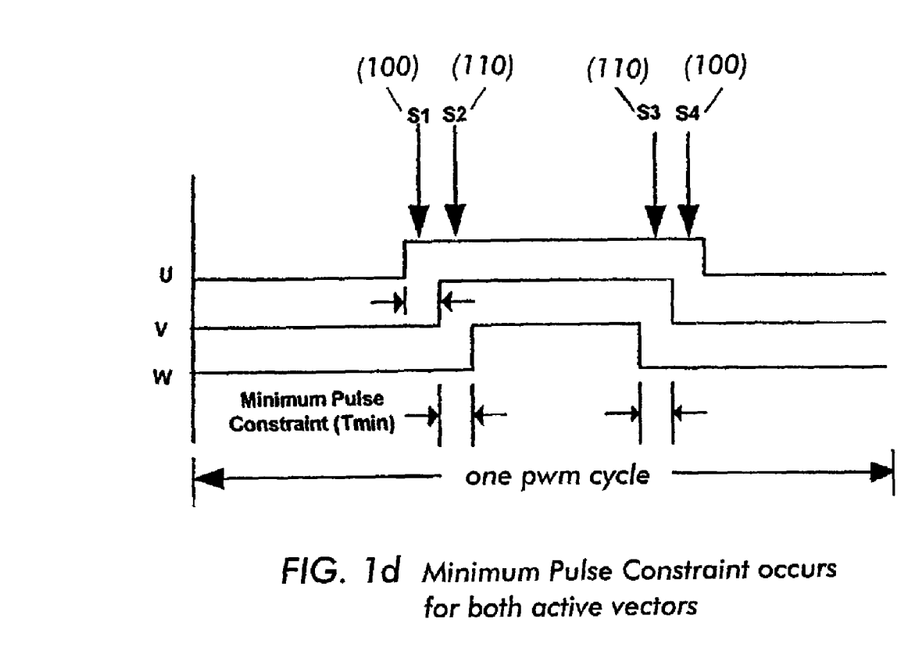
FIG. 1d shows the minimum pulse constraint required when the modulation vector is in the shaded region as in FIG. 1c for both active vectors (100) and (110) in a single PWM cycle.

FIGS. 1c and 1d shows the condition of minimum pulse constraint being imposed for both active vectors (110 and 100).

In this description, the standard voltage vector convention is used. Accordingly, vector (110), for example, is the voltage vector obtained when the high side switches connected to the U and V phases are on and the high side switch connected to the W phase is off. See FIG. 4A. Thus, when the vector 110 is active, switches Q1, Q3 and Q6 are on and switches Q2, Q4 and Q5 are off. If the DC link current is sampled when the 110 vector is active, the sensed current corresponds to the phase current in the motor coil W, corresponding to −iw. Vector 001 would provide a sampled current corresponding to iw.

In normal operation, samples S1 and S4 measure current of the same motor phase (phase U) in the shunt R and samples S2 and S3 measure current of the same motor phase (phase W). See FIG. 4A. These current samples are averaged and reconstructed to generate motor phase currents (iu and iw).

Figure 1E:
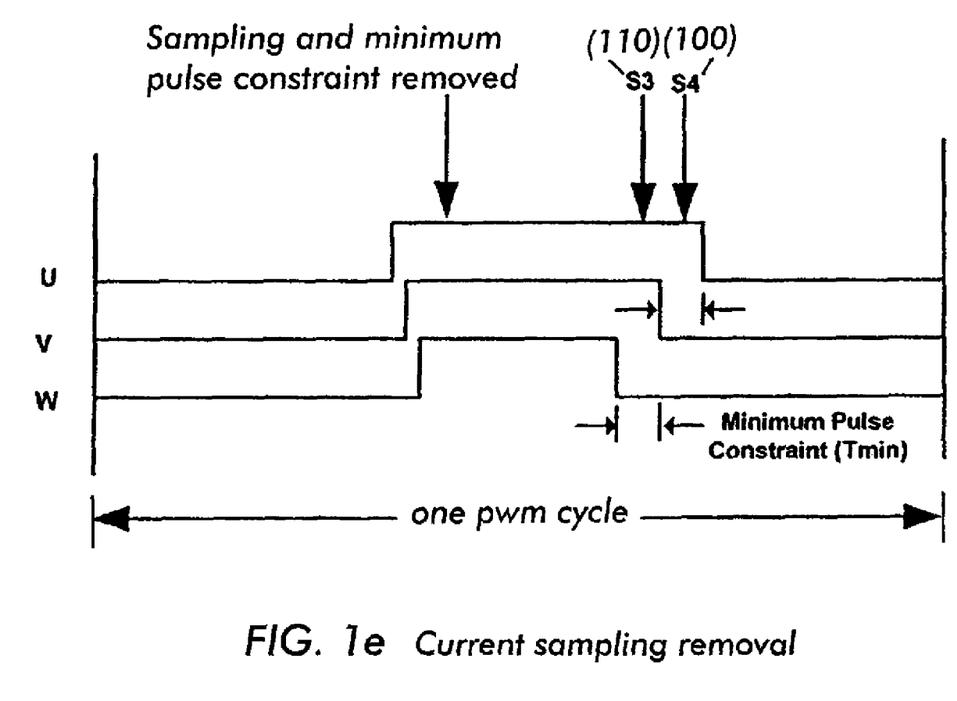
FIG. 1e shows the current sampling and current average removal to reduce audible noise according to the invention when the modulation index is in the shaded area.

As shown in FIG. 1d, S1 and S2 thus sample motor current of different phases. At high modulation index, S1 and S2 (or S3 and S4) move further away from each other (compare FIGS. 1b and 1d), so the phase error between samples S1 and S2 increases. Averaging the two pairs of samples within a PWM cycle eliminates this phase error. However, when motor speed decreases (lower modulation index), samples S1 and S2 approach each other (FIG. 1d) and therefore this phase error is reduced significantly. The current sample averaging can be removed without introducing noticeable phase error. According to the invention, samples S1 and S2 are removed when motor speed falls below a certain threshold. The minimum pulse constraint for sampling S1 and S2 can thus also be removed as shown in FIG. 1e. The minimum pulse constraint occurrence is reduced by half and therefore inverter induced audible noise is also reduced as a consequence.

Figure 2:
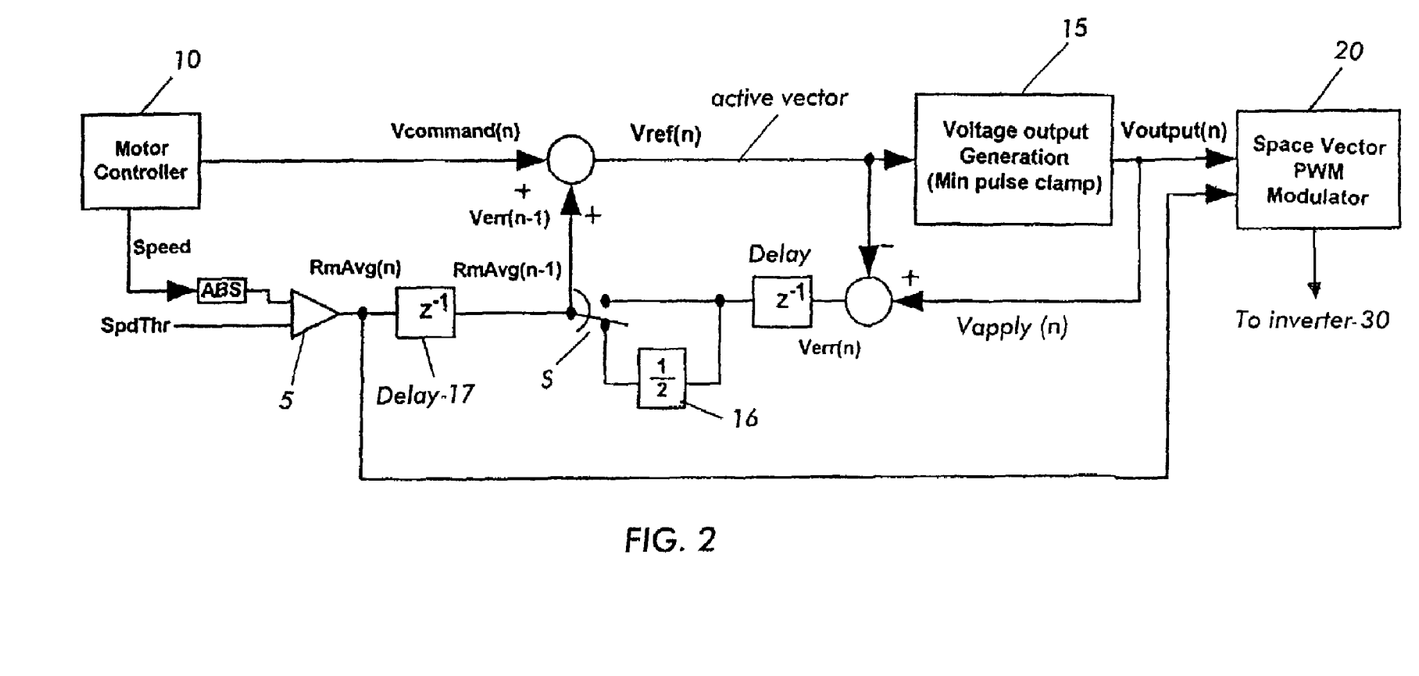
FIG. 2 shows a block diagram of a system implementing the reduced current sampling modulation compensation and current average removal in a motor drive.

FIG. 2 shows the block diagram of a system in a motor drive implementing current averaging removal and voltage (modulation index) error compensation to reduce audible noise. The block diagram can be implemented in various ways, for example in a digital signal processor (DSP) in firmware, in a computer program or as a hard wired electronic circuit or a combination of these. Note that, as shown in FIG. 4, the prior art system (excluding the inverter, is implemented in firmware).

Absolute motor speed is compared via comparator stage 5 to a configurable speed threshold (SpdThr) to form current average removal command (RmAvg(n)). The speed threshold is application dependent. Normally, in a PWM cycle, two averaged current values are generated from four samples S1 to S4. These current values are calculated by (S1+S4)/2 and (S2+S3)/2. When RmAvg(n)=1, i.e., the speed is less than the threshold, the two current values will be directly taken from samples S3 and S4 and samples S1 and S2 are eliminated, as is the current averaging. Thus, samples S1 and S2 of FIG. 1d are removed and the minimum pulse constraint for sampling S1 and S2 is also removed as shown in FIG. 1e. Samples S3 and S4 can be removed instead of samples S1 and S2. The removal of S1 and S2 is preferable to allow the latest current sample updates (S3 and S4) at the end of each PWM cycle to be used.

As a consequence of minimum pulse clamping for current sampling, the actual output voltage is altered to allow minimum pulse insertion. The voltage output generation block 15 of FIG. 2 performs this task.

Figure 3A:
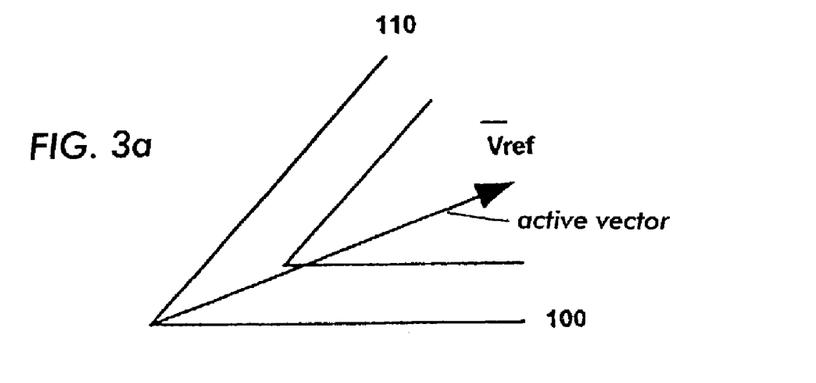
FIGS. 3a, b and c show modulation command generation for three cases including no minimum pulse clamping restriction (FIG. 3a) and two cases requiring minimum pulse clamping restriction (FIGS. 3b and 3c)
Figure 3B:
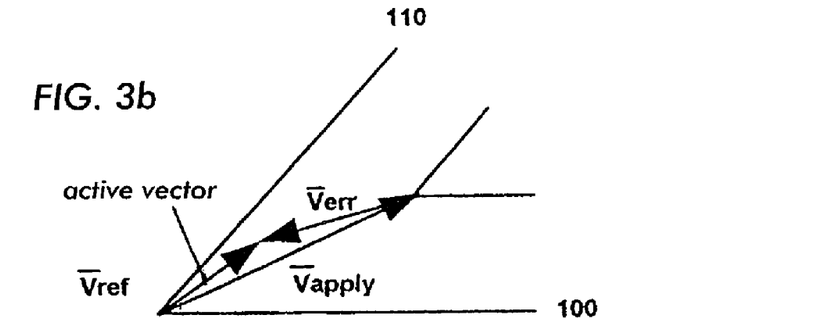
Figure 3C:
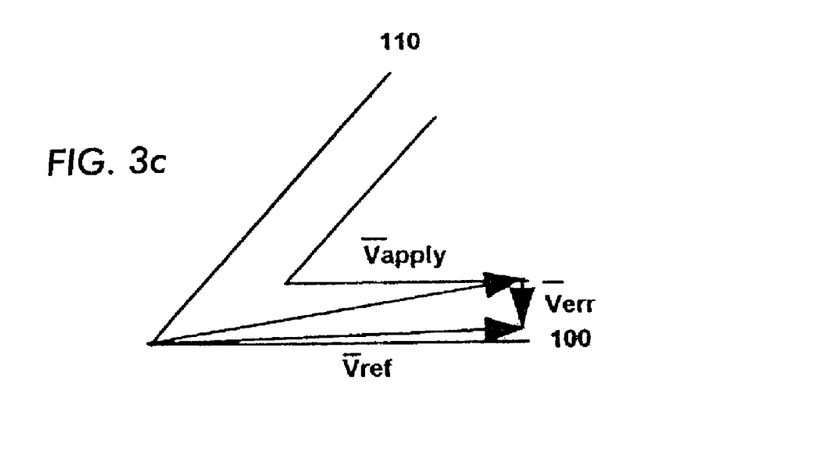

There are 3 cases of voltage generating as shown in FIGS. 3a, 3b and 3c. In case 1 (FIG. 3a), minimum pulse width constraint is not imposed, therefore no modulation compensation (Verr(n)=0) is required. Both cases 2 (FIG. 3b) and 3 (FIG. 3c) require compensation (Verr(n) not equal zero) and output voltage (Voutput(n)) modification. When current average removal takes place (RmAvg(n)=1), the amount of Volt-sec error generated by minimum pulse clamping is reduced by half in a PWM cycle. Therefore Verr(n−1) is scaled down (FIG. 2) when average removal command (RmAvg(n−1)) is set. See element 16, which is switched in when RmAvg(n−1)=1. This is shown by switch S in the position shown in FIG. 2. The delay 17 (RmAvg(n−1) on average removal command (RmAvg(n)) is required to provide proper synchronization between actual minimum pulse removal and voltage error compensation due to the removal of this minimum pulse. The instantaneous (based on one pwm cycle) inverter output volt-sec error is also reduced by half when RmAvg(n)=1.

The following summarizes the three cases:

Case 1: FIG. 3a
Vref is outside unobservable regions (FIG. 1a)

$Verr(n-1)=0$ $Vref(n)=Vcommand(n)+Verr(n-1)$ $Voutput(n)=Vref(n)$

Case 2: FIG. 3b
Vref is inside region of FIG. 1a $Vref(n)=Vcommand(n)+Verr(n-1)$ $Verr(n)=Vapply(n)-Vref(n)$ $Voutput(n)=Vapply(n)$ Note: Vapply(n) is restricted by the minimum pulse width of 110 vector and 100 vector.

Case 3: FIG. 3c
Vref is outside star region of FIG. 1a and inside sector crossing.

$Voutput(n)=Vapply(n)$ $Verr(n)=Vapply(n)-Vref(n)$

Note: Vapply(n) is restricted by the minimum pulse width of 110 vector.

Definitions

Vcommand—modulation command from motor controller.
Voutput—actual modulation output.
Verr—modulation error introduced by minimum pulse clamping.
Vref—compensated modulation command.
Speed—Motor Speed information
SpdThr—Speed Threshold for current average removal
RmAvg—Control bit for commanding current average removal.
where n denotes the present PWM cycle
n−1 denotes the previous PWM cycle Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A method for reducing audible motor noise in a motor drive, wherein the motor drive includes a motor controller driving a PWM space vector modulator providing gating pulses to an inverter providing phase currents to the phase windings of the motor, and wherein phase currents of the motor are determined by taking samples of the DC link current in a DC link powering the inverter, the method comprising:

determining the speed of the motor and comparing the speed to a preset threshold, said preset threshold defining a speed at which audible noise is generated by the motor due to a minimum pulse constraint being imposed on the motor phase currents in order to reliably sample the DC link current to measure the phase currents; and if the speed is below the threshold, sampling the DC link current in the DC link using a reduced number of current samples for a PWM cycle of said PWM space vector modulator to reduce audible motor noise.

2. The method of claim 1, wherein, when the motor speed is above the threshold, four current samples in a PWM cycle in the DC link are taken, and when the motor speed is below the threshold, the current samples are reduced to two current samples.

3. The method of claim 2, wherein the first two samples in a PWM cycle are eliminated thereby utilizing the last two samples in the PWM cycle for determination of the motor phase currents.

4. The method of claim 2, wherein the last two samples in the PWM cycle are eliminated, thereby utilizing the first two samples for determination of the motor phase currents.

5. The method of claim 2, wherein the minimum pulse constraint is imposed on the motor phase currents, and whereby, as a result of the step of reduced current sampling, there are eliminated current samples, and wherein, for the eliminated current samples, phase voltage transitions near the eliminated current samples do not require the minimum pulse constraint.

6. The method of claim 1, wherein the minimum pulse constraint is imposed on the motor phase currents, and whereby, as a result of the step of reduced current sampling, there are eliminated current samples, and wherein, for the eliminated current samples, phase voltage transitions near the eliminated current samples do not require the minimum pulse constraint.

7. The method of claim 1, wherein, when the motor speed is below the threshold, current averaging is eliminated and the current samples are directly used to determine the phase currents.

8. Apparatus for reducing audible motor noise in a motor drive, comprising:
    a motor controller driving a PWM space vector modulator providing gating pulses to an inverter, the inverter providing phase currents to the phase windings of the motor, and wherein phase currents of the motor are determined by taking samples of a DC link current in a DC link powering the inverter;
    the motor controller determining the speed of the motor, further comprising a comparator stage comparing the speed to a preset threshold, said preset threshold defining a speed at which audible noise is generated by the motor due to a minimum pulse constraint being imposed on the motor phase currents in order to reliably sample the DC link current to measure the phase currents; and
    a system for sampling the DC link current in the DC link and if the speed is below the threshold, for reducing the number of current samples of said DC link current in said DC link for a PWM cycle of said PWM space vector modulator to reduce audible motor noise.

9. The apparatus of claim 8, wherein the sampling system operates such that when the motor speed is above the threshold, four current samples in a PWM cycle in the DC link are taken, and when the motor speed is below the threshold, the current samples are reduced to two current samples.

10. The apparatus of claim 9, wherein the sampling system operates such that the first two samples in a PWM cycle are eliminated thereby utilizing the last two samples in the PWM cycle for determination of the motor phase currents.

11. The apparatus of claim 10, wherein the minimum pulse constraint is imposed on the motor phase currents, and whereby, as a result of the reduced current sampling, there are eliminated current samples, and wherein, for the eliminated current samples, phase voltage transitions near the eliminated current samples do not require the minimum pulse constraint.

12. The apparatus of claim 9, wherein the sampling system operates such that the last two samples in the PWM cycle are eliminated, thereby utilizing the first two samples for determination of the motor phase currents.

13. The apparatus of claim 8, wherein the minimum pulse constraint is imposed on the motor phase currents, and whereby, as a result of the reduced current sampling, there are eliminated current samples, and wherein, for the eliminated current samples, phase voltage transitions near the eliminated current samples do not require the minimum pulse constraint.

14. The apparatus of claim 8, wherein, when the motor speed is below the threshold, current averaging is eliminated and the current samples are directly used to determine the phase currents.

* * * * *